United States Patent [19]

Kamis

[11] Patent Number: 5,119,989
[45] Date of Patent: Jun. 9, 1992

[54] DRIPLESS SPRAY NOZZLE

[75] Inventor: Peter A. Kamis, Willoughby Hills, Ohio

[73] Assignee: Lubriquip, Inc., Cleveland, Ohio

[21] Appl. No.: 656,237

[22] Filed: Feb. 15, 1991

[51] Int. Cl.⁵ .................. B05B 7/04; B05B 15/02
[52] U.S. Cl. .......................... 239/8; 239/106;
    239/124; 239/412; 239/413; 239/417.5;
    239/434; 239/571
[58] Field of Search .................. 239/8, 104, 106, 112,
    239/113, 120, 121, 124, 126, 412, 413, 417.5,
    434, 570, 571, 574

[56] References Cited

U.S. PATENT DOCUMENTS

| | | |
|---|---|---|
| 1,252,103 | 1/1918 | Gilmer . |
| 1,351,524 | 8/1920 | La Rue . |
| 1,725,581 | 8/1929 | Hendricks . |
| 1,834,058 | 12/1931 | Herr . |
| 2,567,774 | 9/1951 | Le Clair . |
| 2,650,003 | 8/1953 | Coleman . |
| 3,394,888 | 7/1968 | Dasse et al. .......... 239/571 |
| 3,561,680 | 2/1971 | Ott .......................... 239/413 |
| 3,756,348 | 9/1973 | Iizumi . |
| 3,857,513 | 12/1974 | Wiggins . |
| 4,047,664 | 9/1977 | Kranc et al. . |
| 4,375,865 | 3/1983 | Springer . |
| 4,403,736 | 9/1983 | Scharfenberger . |
| 4,422,576 | 12/1983 | Saito et al. . |
| 4,529,127 | 7/1985 | Huszagh . |
| 4,549,676 | 10/1985 | Gerich ................... 239/112 |
| 4,620,669 | 11/1986 | Polk . |
| 4,745,011 | 5/1988 | Fukuta et al. .......... 239/413 |
| 4,785,913 | 11/1988 | Maurer et al. . |

Primary Examiner—Andres Kashnikow
Assistant Examiner—Karen B. Merritt
Attorney, Agent, or Firm—Hill, Van Santen, Steadman & Simpson

[57] ABSTRACT

A dripless spray nozzle for an intermittent or cyclical spraying operation providing a spray manifold having an inlet port for receiving a pumped material to be sprayed, such as pressurized lube oil, and an inlet port for receiving pressurized air, a mixing chamber for mixing the material and the air, an outlet for conveying the mixture to an attached spray nozzle for spraying an air/material mixture onto an object such as an air/lube oil mixture onto a wheel of a railroad transit car. The spray manifold further comprises a first check valve downstream of the mixing chamber, and a second check valve mounted in the material inlet port. The material to be sprayed is intermittently or cyclically pumped past the second check valve into the mixing chamber. Pressurized air mixes therein with the material and the mixture is sprayed past the first check valve. A reduction in pressure of the pumped material closes the second check valve. The pressurized air is controlled to purge the manifold and then to vent the manifold to atmosphere to prevent seepage of material past the first check valve.

14 Claims, 1 Drawing Sheet

DRIPLESS SPRAY NOZZLE

BACKGROUND OF THE INVENTION

This invention relates to a spray nozzle for intermittently or cyclically spraying a material using a propellant fluid such as compressed air which prevents dripping between cycles. More particularly, this invention relates to the intermittent and drip-free spraying of lubricant. A particularly useful application is the distribution of lubricant to the wheels of vehicles which run on rails or tracks.

When a wheel rolls on a track it has rolling contact with the track and theoretically does not require lubrication. Yet, it is found that applying a very slight amount of lubricant therebetween contributes to a smoother and quieter ride. This is particularly effective when applied on curves to reduce rubbing which takes place between the flanges of the outer wheels and the outer rail due to centrifugal force.

It is known to provide an automatic acting system whereby lubricant can be sprayed to the flanges or tires of wheels such as rail cars, when same are running around curves. Such a system is disclosed in U.S. Pat. No. 2,567,774.

However, it is important, since rail cars cross over roadways, to minimize or eliminate unwanted drippage of lubricating oil during periods in between spraying cycles. Avoidance of drippage also assists in conservation of the lubricant and the attendant cost reduction.

SUMMARY OF THE INVENTION

The present invention provides for a system ensuring a dripless operation of a spray nozzle between spraying cycles. Although this invention has wide application to spraying of all types, this dripless spray nozzle is particularly suited to cyclical or intermittent spraying of lubricant.

In a lube oil spraying system wherein compressed air mixes with pumped lubricant in a mixing chamber to be sprayed thereafter through a spraying nozzle, dripping can be a problem. Even when the mixing chamber is purged by the pressurized air after the flow of lubricant has selectively ceased, seepage can still occur. If the lubricating line refills due to seepage past a lube oil check valve which blocks lube oil flow into the mixing chamber, seepage out of the spraying nozzle can occur. This effect can be magnified due to ambient temperature increases and vibration.

It is an object of the present invention to provide a dripless spray nozzle for spraying any appropriate material which can be shut off between spraying cycles with no resultant dripping. In a nozzle of this type, a manifold block is provided having a mixing chamber. The manifold block also has an air inlet and an inlet for the material to be sprayed. The air inlet and the inlet for the material flow-intersect at the mixing chamber. An outlet pathway from the mixing chamber communicates to a spray nozzle mounted onto the manifold block. A spring loaded outlet check valve is arranged upstream of the spray nozzle and a spring loaded material check valve is arranged in the material inlet to the manifold. The invention will be more particularly described with respect to a lubrication application.

For a lube oil system application, a lube oil pump feeds pressurized lube oil through a lube oil check valve into the mixing chamber, and a pressurized air supply feeds pressurized air into the mixing chamber. The mixing chamber communicates the resultant air/lube oil mixture through an outlet check valve to a spray nozzle. The air supply communicates compressed air through a three-way solenoid valve to the mixing chamber.

Upon the start of a spraying cycle, both the lube oil and air are free to mix and exit out of the nozzle through the outlet check valve. The outlet check valve is spring biased to the closed position. Sufficient air and lube oil pressure from the mixing chamber will open the outlet check valve during spraying. At the end of a spray cycle, the lube oil pressure from the lube oil pump is decreased and the lube oil check valve closes. The lube oil check valve is also spring biased to the closed position, a decrease in the lube oil pressure causing the spring to close the lube oil check valve. Air flow is maintained for several seconds thereafter to vacate the mixing chamber and the nozzle of lube oil. When the air is eventually shut off the three-way valve simultaneously opens the air inlet to atmospheric pressure. The mixing chamber is now vented to atmospheric pressure, so that any additional seepage from the lube oil line past the lube oil check valve will collect in the mixing chamber but cannot build sufficient pressure in the mixing chamber to open up or to seep lube oil past the outlet check valve.

Thus, the selective cycle of air purging the mixing chamber and nozzle after lube oil has ceased plus the closing of the outlet check valve and venting of the mixing chamber to atmosphere leads to a dripless spray nozzle.

DETAILED DESCRIPTION OF THE PREFERRED EMBODIMENTS

Figure 1:
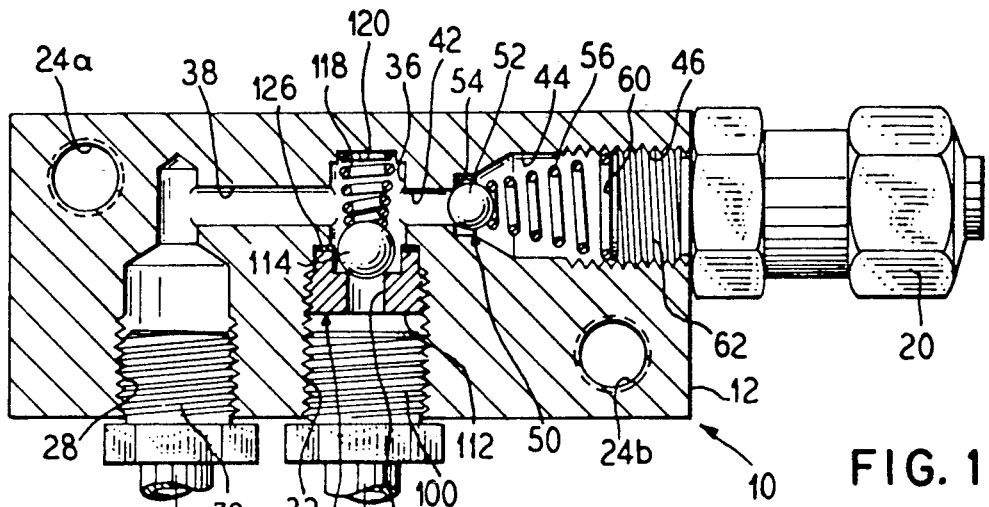
FIG. 1 is a longitudinal sectional view of a spray nozzle assembly, with an air supply system and a lube oil supply shown schematically.

FIG. 1 shows a spray nozzle system generally at 10 comprising as major components a manifold block 12, an air supply system 14 and a lube oil supply system 16. The manifold block mounts at an outlet end a spray nozzle 20. The manifold block 12 has holes 24a, 24b therethrough for effective assembly and/or mounting of the spray manifold 12 adjacent to a wheel or object to be sprayed (not shown). The manifold block 12 has formed thereinto an air inlet port 28 and a lube oil inlet port 32. The lube oil inlet port 32 terminates in a mixing chamber 36. A branch line 38 provides communication between the air inlet port 28 and the mixing chamber 36. An outlet line 42 provides communication for the air and lube oil thus mixed in the mixing chamber with an outlet chamber 44. The outlet chamber 44 terminates in an outlet port 46 at which is mounted the spray nozzle 20 for conduction of the air and lube oil mixture from the manifold 12 to the object to be sprayed. Mounted in the outlet chamber 44 is an outlet check valve which comprises a ball 52 biased against a mouth 54 of the outlet line 42 by a spring 56. The spring 56 can be arranged between the ball 52 and a penetrating end 60 of a threaded male end portion 62 of the spray nozzle 20 which screws into the outlet port 46 of the manifold 12.

The air supply system 14 comprises a pressurized air source 70 communicating to a three-way air solenoid valve 72. Air passing through the three-way air solenoid valve 72 is carried by an air line 76 which communicates with the air inlet port 28. The air line 76 can be threaded at an outlet end 78 for connection to manifold 12 into the inlet port 28. The three-way air solenoid valve shown schematically operates in a first position (not shown) to pass air from the air source 70 to the air supply line 76 by connecting port 79 with a passage 80 in the valve 72. In a second position, as shown in Figure I, the three-way air solenoid valve 72 connects the air supply line 76 through a second valve passage 81 to an atmospheric exhaust 82 which effectively vents the mixing chamber 36, the branch line 38 and the air inlet port 28 to atmosphere. Additionally, in the second position, the air source 70 is simultaneously disconnected from the air supply line 76 and effectively closed.

The lube oil supply system 16 comprises a lube oil pump 90 fed from a lube oil reservoir 94 and operable to transport lube oil through a lube oil line 98. The lube oil line 98 is connected at an outlet end 100 to the lube oil inlet port 32. Mounted inside the lube oil inlet port 32 is a lube oil check valve 110. The lube oil check valve 110 comprises a keeper member or seat 112 upon which rests a check ball 114 which can effectively cover an aperture 116 formed in the seat 112, closing off flow through the lube oil inlet port 32. The check ball 114 is biased against the aperture 116 by a lube oil spring 118 which abuts at an opposite end a ceiling 120 of the mixing chamber 36. The seat 112 is mounted into the lube oil inlet port 32 either by being threaded thereinto or inserted thereinto and abutted by the outlet end 100 of the lube oil line 98 being inserted threadingly into the lube oil inlet port 32 in abutting engagement with the seat 112. The seat 112 is sealed against the manifold block 12 with a gasket or O-ring 126.

The operation of the arrangement 10 for a no-drip intermittent or cyclical spraying is described as follows. A system controller (not shown) synchronizes the various cycles of the lube oil system 16 and the air system 14 with an appropriate precondition for spraying. Such a precondition can be a sensor which indicates when lube oil is needed, such as when a rail car is moving into a curve. During a spraying cycle the lube oil pump 90 provides pressurized lube oil into the lube oil inlet port 32 having a sufficient pressure to lift the check ball 114 off of the aperature 116 to permit the lube oil to flow into the mixing chamber 36. Simultaneously, the air source 70 passes air through the three-way air solenoid valve, the air solenoid valve 72 being in the first position (not shown). The pressurized air passes through the airinlet lie 76, through the branch line 38 and into the mixing chamber 36 for moving with the lube oil. The mixture of air and lube oil which passes through the outlet line 42 is of sufficient pressure to move the ball 52 away from the mouth 54 of outlet line 42 to pass the mixture through the outlet chamber 44, through the outlet port 46 and into the spray nozzle 20 for spraying upon an object (not shown). When the spraying cycle ceases, the lube oil pump 90 decrease the output pressure of the lube oil in the lube oil line 98, and the check ball 114, under the bias of the lube oil spring 118, returns to a closed position against the seat 112 and particularly over the aperture 116. Next, the air supply is maintained in its second position for several seconds to blow air through the air inlet port 28, the branch line 38, the mixing chamber 36, the outlet line 42, the check valve 50, the outlet chamber 44, the outlet port 46 and finally the spray nozzle 20 to purge those components of residue lube oil. The three-way air solenoid valve then simultaneously closes the air supply and vents the air supply port 28, the branch line 32, the mixing chamber 36, and the outlet line 42 to atmosphere through the exhaust 82. The check valve 50, feeling no back pressure, closes under the influence of the spring 58. The nozzle should now be in a dripless condition until the next lube oil spraying cycle. In the event that any lube oil should seep past the check ball 114 into the mixing chamber 36, the mixing chamber will be maintained at atmospheric pressure and thus the ball 52 will remain sealed against mouth 54 preventing any drippage from the nozzle 20.

This spraying arrangement and procedure is not only advantageous for spraying lubricant but can be utilized for spraying other materials as well where a positive dripless shutoff is desired.

Figure 3:
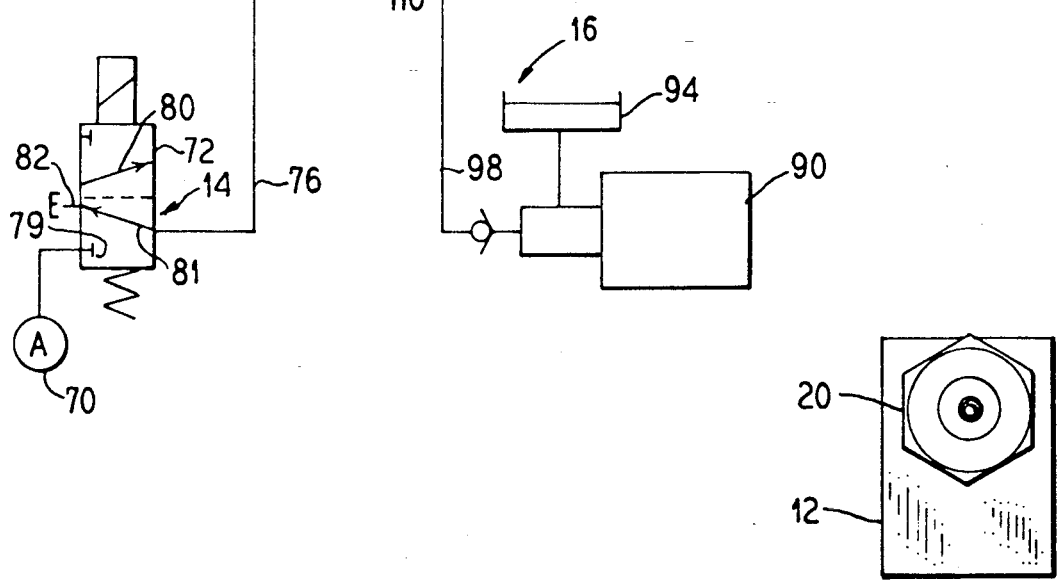
FIG. 3 is a right side elevational view of the spray nozzle assembly.
Figure 2:
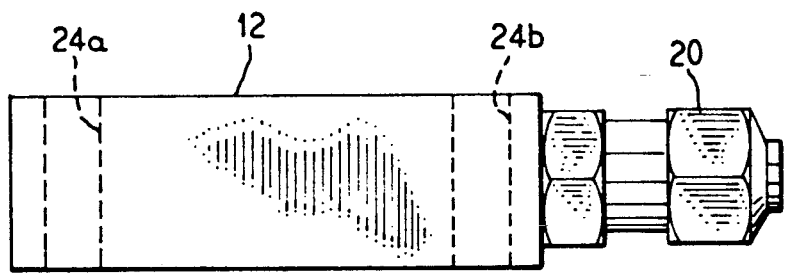
FIG. 2 is a top plan view of the spray nozzle assembly.

FIG. 2 and FIG. 3 show various views of the spray manifold 12 and the spray nozzle 20. The spray manifold 12 comprises a box-like, compact and sturdy configuration for mounting adjacent to an object to be sprayed such as a wheel of a railroad car.

Although the present invention has been described with reference to a specific embodiment, those of skill in the art will recognize that changes may be made thereto without departing from the scope and spirit of the invention as set forth in the appended claims.

I claim as my invention:

1. A spray nozzle arrangement comprising:
   a supply of a first pressurized fluid;
   a supply of a second pressurized fluid;
   a first supply line flow connected to said supply of said first pressurized fluid;
   a second supply line flow connected to said supply of said second pressurized fluid;
   a manifold having a mixing chamber flow communicating through said first and second supply lines with said supplies of first and second pressurized fluids, said mixing chamber receiving and mixing flows of said first and second pressurized fluids, said manifold also having an outlet path from said mixing chamber with an outlet valve arranged in said outlet path, and an inlet valve arranged between one of said supplies of fluid and said mixing chamber;
   a spray nozzle mounted to said manifold in communication with said outlet path and receiving flow of a mixture of said first and second fluids which passes through said outlet valve;
   a means for selectively communicating said second supply of fluid into said manifold and alternatively venting said mixing chamber to atmosphere through said second supply line.

2. A spray nozzle arrangement according to claim 1, wherein said outlet valve is a spring biased ball valve biased in the closed condition.

3. A spray nozzle arrangement according to claim 1, wherein said inlet valve is a ball check valve, flow located in said first supply line, having a spring for biasing said ball check valve in the closed condition, preventing said firs fluid from passing into said mixing chamber.

4. A spray nozzle arrangement comprising:
   a supply of a first pressurized fluid;
   a supply of a second pressurized fluid;
   a manifold having a mixing chamber communicating with said supplies of first and second pressurized fluids, said mixing chamber receiving and mixing flows of said first and second pressurized fluids, said manifold also having an outlet path from said mixing chamber with an outlet valve arranged in said outlet path, and an inlet valve arranged between a first of said supplies of fluid and said mixing chamber;

a spray nozzle mounted to said manifold in communication with said outlet path and receiving flow of a mixture of said first and second fluids which passes through said outlet valve;

a means for selectively communicating said second supply of fluid into said manifold and alternatively venting said mixing chamber to atmosphere; and wherein said outlet valve and said inlet valve are spring baised ball check valves, and said manifold comprises a block with an inlet port formed thereinto, and an outlet port formed thereinto, said inlet port and said outlet port intersecting for flow at said mixing chamber, and said inlet valve and said outlet valve are mounted into said inlet port and said outlet port respectively.

5. A spray nozzle arrangement according to claim 4, wherein said second fluid is communicated to said manifold through an inlet line which is connected to a second inlet port, said second inlet port formed into said manifold and intersecting for flow at said mixing chamber, and said means for selectively communicating is a three-way air solenoid valve.

6. A method of operating a spray nozzle to eliminate drips during non-spraying in an intermittent operation, comprising the steps of:

providing a closable spray nozzle;

providing two separate supplies of pressurized fluids, a first and second supply of pressurized fluids;

providing a mixing volume in flow communication with said spray nozzle and said first and second supplies of pressurized fluids, for mixing simultaneous flows of said first and second fluids to be sprayed as a mixture out of said spray nozzle;

providing for intermittent commencement and cessation of flow of said first pressurized fluid into said mixing volume;

causing said first and second pressurized fluids to flow into said mixing volume with said nozzle open to the mixing volumed for spraying;

providing that after cessation of flow of said first pressurized fluid into said mixing volume said nozzle closes and said mixing volume is vented to atmospheric pressure at a point in a flow path of said second pressurized fluid upstream of said mixing volume.

7. A method of operating a spray nozzle to eliminate drips during non-spraying in an intermittent operation, comprising the steps of:

providing a closable spray nozzle;

providing two separate supplies of pressurized fluids;

providing a mixing volume in communication with said spray nozzle for mixing simultaneous flows of said first and second fluids to be sprayed as a mixture out of said spray nozzle;

providing for intermittent commencement and cessation of a first fluid flow into said mixing volume;

causing said first and second pressurized fluids to flow into said mixing volume with said nozzle open to the mixing volume for spraying;

providing that after cessation of said first fluid flow into said mixing volume said nozzle closes and said mixing volume in vented to atmospheric pressure; and after the cessation of said first fluid flow into the mixing volume, but before the nozzle is closed, providing a flow of said second fluid to purge said first fluid from the nozzle and mixing chamber.

8. A spray nozzle arrangement for intermittent application of lube oil, comprising:

a supply of pressurized air;

a supply of pressurized lube oil;

a first supply line in flow communication with said supply of pressurized air;

a second supply line in flow communication with said supply of pressurized lube oil;

a manifold having a mixing chamber flow connected through said first and second supply lines to said supplies of pressurized air and lube oil, said mixing chamber receiving and mixing flows of pressurized air and lube oil from said supply of pressurized air and said supply of lube oil respectively, said manifold also having an outlet valve arranged in an outlet path of said mixing chamber, and a lube oil inlet valve arranged in said flow of lube oil;

a spray nozzle mounted to said manifold in communication with said outlet path and receiving flow of mixed lube oil and air which passes through said outlet valve;

a means for selectively communicating said supply of pressurized air into said manifold and alternatively venting said mixing chamber to atmosphere through said second supply line.

9. A spray nozzle arrangement according to claim 8, wherein said outlet valve is a spring biased ball valve biased in the closed condition.

10. A spray nozzle arrangement according to claim 8, wherein said lube oil inlet valve is a ball check valve, flow located in said fist supply line, having a spring for biasing said ball check valve in the closed condition, preventing lube oil from passing into said mixing chamber.

11. A spray nozzle arrangement for intermittent application of lube oil, comprising:

a supply of pressurized air;

a supply of pressurized lube oil;

a manifold having a mixing chamber flow connected for flow to said supplies of pressurized air and lube oil, said mixing chamber receiving and mixing flows of pressurized air and lube oil from said supply of pressurized air and said supply of lube oil respectively, said manifold also having an outlet valve arranged in an outlet path of said mixing chamber, and a lube oil inlet valve arranged in said flow of lube oil;

a spray nozzle mounted to said manifold in communication with said outlet path and receiving flow of mixed lube oil and air which passes through said outlet valve;

a means for selectively communicating said supply of pressurized air into said manifold and alternatively venting said mixing chamber to atmosphere; and wherein said outlet valve and said lube oil inlet valve are spring baised ball check valves, and said manifold comprises a block with a lube oil inlet port formed thereinto, and an outlet port formed thereinto, said lube oil inlet port and said outlet port intersecting for flow at said mixing chamber, and said lube oil valve and said outlet valve are mounted into said lube oil inlet port and said outlet port respectively.

12. A spray nozzle arrangement according to claim 11, wherein said pressurized air is communicated to said manifold through an air inlet line which is connected to an air inlet port, said air inlet port formed into said manifold and intersecting for flow said mixing chamber, and said means for selectively communicating is a three-way air solenoid valve.

13. A method of operating a lube oil spray nozzle to eliminate drips during non-spraying in an intermittent operation, comprising the steps of:

providing a closable spray nozzle;

providing a pressurized supply of air and a pressurized supply of lube oil;

providing a mixing volume in flow communication with said supply of air and lube oil for mixing simultaneous flows of air and lube oil to be sprayed as a mixture out of said spray nozzle;

providing for intermittent commencement and cessation of lube oil flow into said mixing volume;

causing flow of pressurized air and lubed oil into said mixing volume with said nozzle open to the mixing volume for spraying; p1 providing that after cessation of lube oil flow into said mixing volume said nozzle closes and said mixing volume is vented to atmospheric pressure at a point in a flow path of said air upstream of said mixing volume.

14. A method of operating a lube oil spray nozzle to eliminate drips during non-spraying in an intermittent operation, comprising the steps of:

providing a closable spray nozzle;

providing a pressurized supply of air and a pressurized supply of lube oil;

providing a mixing volume for mixing simultaneous flows of air and lube oil to be sprayed as a mixture out of said spray nozzle;

providing for intermittent commencement and cessation of lube oil flow into said mixing volume;

causing pressurized air and lube oil to flow into said mixing volume with said nozzle open to the mixing volume for spraying;

providing that after cessation of material flow into said mixing volume said nozzle closes and said mixing volume is vented to atmospheric pressure; and after the cessation of lube oil flow into the mixing volume, but before the nozzle is closed, providing a flow of air to purge lube oil from the nozzle and mixing chamber.

* * * * *